United States Patent
Wang (10) Patent No.: US 12,153,312 B2
(45) Date of Patent: Nov. 26, 2024

(54) ARRAY SUBSTRATE COMPRISING FIRST AND SECOND ELECTRODES EACH HAVING A PLURALITY OF BRANCH ELECTRODES ARRANGED AT INTERVALS AND LIQUID CRYSTAL DISPLAY PANEL

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Yanan Wang, Huizhou (CN)

(73) Assignees: HUZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/599,317

(22) PCT Filed: Sep. 7, 2021

(86) PCT No.: PCT/CN2021/116918
§ 371 (c)(1),
(2) Date: Sep. 28, 2021

(87) PCT Pub. No.: WO2023/029063
PCT Pub. Date: Mar. 9, 2023

(65) Prior Publication Data
US 2024/0053642 A1  Feb. 15, 2024

(30) Foreign Application Priority Data
Aug. 30, 2021 (CN) .......................... 202111006393.3

(51) Int. Cl.
*G02F 1/1343* (2006.01)
*G02F 1/1333* (2006.01)
*G02F 1/1335* (2006.01)

(52) U.S. Cl.
CPC .. *G02F 1/134336* (2013.01); *G02F 1/133345* (2013.01); *G02F 1/133357* (2021.01); *G02F 1/133514* (2013.01)

(58) Field of Classification Search
CPC ..................... G02F 1/133357; G02F 1/133757
See application file for complete search history.

(56) References Cited

U.S. PATENT DOCUMENTS

2015/0177575 A1* 6/2015 Rho ...................... G02F 1/1393
349/138
2015/0268518 A1* 9/2015 Shin .................. G02F 1/134309
349/142

(Continued)

FOREIGN PATENT DOCUMENTS

CN         101925853 A      12/2010
CN         204166255 U      2/2015
(Continued)

OTHER PUBLICATIONS

Chinese Office Action issued in corresponding Chinese Patent Application No. 202111006393.3 dated Mar. 25, 2022, pp. 1-8.
(Continued)

*Primary Examiner* — Paul C Lee
(74) *Attorney, Agent, or Firm* — PV IP PC; Wei Te Chung (57) ABSTRACT

The present invention provides an array substrate and a liquid crystal display. The liquid crystal display panel provided by the embodiment of the present application comprises an array substrate. The array substrate reduces the pretilt angle conflict between two adjacent areas by canceling the main electrode of the buffer area, or setting projec- (Continued)

tion part on the array substrate after canceling the main electrode of the buffer area, adding DBS electrodes, etc. This prevents the problem of mutual obstruction of liquid crystal molecules when deflecting, thereby improving dark mass and solving the problem of uneven display.

18 Claims, 6 Drawing Sheets

(56) References Cited

U.S. PATENT DOCUMENTS

| | | | |
|---|---|---|---|
| 2016/0209716 A1* | 7/2016 | Kim | G02F 1/134309 |
| 2016/0246135 A1* | 8/2016 | Tae | G02F 1/133707 |
| 2018/0149931 A1* | 5/2018 | Xu | G02F 1/134336 |

FOREIGN PATENT DOCUMENTS

| | | | | |
|---|---|---|---|---|
| CN | 104730785 A | | 6/2015 | |
| CN | 104880867 A | * | 9/2015 | ....... G02F 1/133707 |
| CN | 105116657 A | | 12/2015 | |
| CN | 105572983 A | * | 5/2016 | ....... G02F 1/133707 |
| CN | 105842937 A | | 8/2016 | |
| CN | 106094369 A | | 11/2016 | |
| CN | 109324450 A | | 2/2019 | |
| CN | 110794626 A | | 2/2020 | |
| CN | 111221189 A | | 6/2020 | |
| CN | 111258130 A | | 6/2020 | |
| CN | 111427199 A | | 7/2020 | |
| CN | 112596310 A | | 4/2021 | |
| CN | 113064299 A | | 7/2021 | |
| CN | 113589607 A | | 11/2021 | |
| CN | 113703231 A | | 11/2021 | |
| JP | 2004302174 A | | 10/2004 | |
| WO | 2020087582 A1 | | 5/2020 | |
| WO | 2020137495 A1 | | 7/2020 | |

OTHER PUBLICATIONS

Notification to Grant Patent Right for Invention issued in corresponding Chinese Patent Application No. 202111006393.3 dated Jun. 1, 2022, pp. 1-4.
International Search Report in International application No. PCT/CN2021/116918, mailed on Jun. 1, 2022.
Written Opinion of the International Searching Authority in International application No. PCT/CN2021/116918, mailed on Jun. 1, 2022.

* cited by examiner

ARRAY SUBSTRATE COMPRISING FIRST AND SECOND ELECTRODES EACH HAVING A PLURALITY OF BRANCH ELECTRODES ARRANGED AT INTERVALS AND LIQUID CRYSTAL DISPLAY PANEL

RELATED APPLICATIONS

This application is a Notional Phase of PCT Patent Application No. PCT/CN2021/116918 having international filing date of Sep. 7, 2021, which claims the benefit of priority of Chinese Patent Application No. 202111006393.3 filed on Aug. 30, 2021. The contents of the above applications are all incorporated by reference as if fully set forth herein in their entirety.

BACKGROUND OF INVENTION

Field of Invention

The present invention relates to a field of display technology, and in particular to an array substrate and a liquid crystal display panel.

Description of Prior Art

The application of liquid crystal display panels in curved displays faces many challenges. Because the surface is a curved plane, a symmetrical elliptical dark mass will be formed in the surface state. The dark mass is caused by deviation of the upper and lower substrates. The main way to improve the dark mass is to reduce a pretilt angle of the upper substrate and simplify a terrain structure of the upper substrate.

During the research and practice of the prior art, the inventor of the present application found that in practical applications, it is difficult to achieve an extremely small pretilt angle of the upper substrate, and the morphology of the lower substrate also plays a key role in improving the dark mass. Therefore, it is necessary to design the lower substrate. In the liquid crystal display panel of multi domain display, the pretilt angle conflict of the corresponding liquid crystal molecules at the junction of the adjacent alignment regions in the pixel is the most serious, so the adjacent alignment regions in the sub-pixel are more likely to produce dark mass.

SUMMARY OF INVENTION

The present invention provides an array substrate and a liquid crystal display panel, through the design of pixels, the pretilt conflict of liquid crystal molecules corresponding to the junction of adjacent alignment regions in pixels is improved, and then the dark mass in curved display screen is improved.

The present invention provides an array substrate, comprising:
  a substrate; and
  a plurality of electrode units, wherein the plurality of electrode units are disposed on the substrate, and the plurality of electrode units comprise a first pixel electrode and a second pixel electrode disposed on one side of the first pixel electrode;
  the first pixel electrode comprises a plurality of first branch electrodes, the plurality of first branch electrodes are arranged at intervals, and the first branch electrodes are configured to guide liquid crystal molecules to a first direction;
  the second pixel electrode is disposed opposite to the first pixel electrode, the second pixel electrode comprises a plurality of second branch electrodes, the plurality of second branch electrodes are arranged at intervals, and the second branch electrodes are configured to guide the liquid crystal molecules to a second direction; and
  at least part of the first branch electrodes have one end vacant, and at least part of the second branch electrodes have one end vacant.

In one exemplary embodiment, wherein the array substrate further comprises a color filter layer, the color filter layer comprises first color filters, and two adjacent first color filters are respectively disposed corresponding to the first pixel electrode of one electrode unit and the second pixel electrode of another electrode unit.

In one exemplary embodiment, wherein the first pixel electrode further comprises a plurality of third branch electrodes, the third branch electrodes are disposed adjacent to the first branch electrodes, the plurality of third branch electrodes are arranged at intervals, the third branch electrodes are configured to guide the liquid crystal molecules to a third direction, the second pixel electrode further comprises a plurality of fourth branch electrodes, the fourth branch electrodes are disposed adjacent to the second branch electrodes, a plurality of the fourth branch electrodes are arranged at intervals, and the fourth branch electrodes are configured to guide the liquid crystal molecules to a fourth direction; and
  wherein at least part of the third branch electrodes have one end vacant, and at least part of the fourth branch electrodes have one end vacant.

In one exemplary embodiment, wherein the electrode units further comprise a plurality of connecting electrodes and a main electrode;
  one connecting electrode is disposed between the first branch electrodes and the third branch electrodes, another one connecting electrode is disposed on a side of the first branch electrodes away from the third branch electrodes, and the other connecting electrode is disposed on a side of the third branch electrodes away from the first branch electrodes, and the connecting electrodes connect the first branch electrodes and the third branch electrodes; and
  the main electrode is disposed on one side away from the ends vacant of the first branch electrodes and the third branch electrodes and is connected with the first branch electrodes and the third branch electrodes.

In one exemplary embodiment, wherein the electrode units further comprise a plurality of connecting electrodes and a main electrode;
  one connecting electrode is disposed between the second branch electrodes and the fourth branch electrodes, another one connecting electrode is disposed on a side of the second branch electrodes away from the fourth branch electrodes, and the other connecting electrode is disposed on a side of the fourth branch electrodes away from the second branch electrodes, and the connecting electrodes connect the second branch electrodes and the fourth branch electrodes; and
  the main electrode is disposed on one side away from the ends vacant of the second branch electrodes and the fourth branch electrodes and is connected with the second branch electrodes and the fourth branch electrodes.

In one exemplary embodiment, wherein the first pixel electrode further comprises a plurality of fifth branch electrodes and a plurality of sixth branch electrodes, the plurality of fifth branch electrodes are arranged at intervals, the plurality of sixth branch electrodes are arranged at intervals, the fifth branch electrodes are configured to guide the liquid crystal molecules to a fifth direction, the sixth branch electrodes are configured to guide the liquid crystal molecules to a sixth direction, and the fifth branch electrodes and the sixth branch electrodes are sequentially arranged along an arrangement direction of the first branch electrodes and the third branch electrodes; and wherein at least part of the fifth branch electrodes have one end vacant, and at least part of the sixth branch electrodes have one end vacant.

In one exemplary embodiment, wherein the electrode units further comprise a strip electrode and a shaft electrode;

the strip electrode is disposed between the fifth branch electrodes and the sixth branch electrodes, and the strip electrode is connected with the fifth branch electrodes and the sixth branch electrodes; and the shaft electrode is disposed on a side of the fifth branch electrodes and the sixth branch electrodes away from the second pixel electrode and is connected with the fifth branch electrodes and the sixth branch electrodes.

In one exemplary embodiment, wherein the strip electrode further disposed on a side of the fifth branch electrodes away from the sixth branch electrodes and on a side of the sixth branch electrodes away from the fifth branch electrodes.

In one exemplary embodiment, wherein the second pixel electrode further comprises a plurality of seventh branch electrodes and a plurality of eighth branch electrodes, the plurality of seventh branch electrodes are arranged at intervals, the plurality of eighth branch electrodes are arranged at intervals, the seventh branch electrodes are configured to guide the liquid crystal molecules to a seventh direction, the eighth branch electrodes are configured to guide the liquid crystal molecules to a eighth direction, the seventh branch electrodes and the eighth branch electrodes are sequentially arranged along an arrangement direction of the second branch electrodes and the fourth branch electrodes; and wherein at least part of the seventh branch electrodes have one end vacant, and at least part of the eighth branch electrodes have one end vacant.

In one exemplary embodiment, wherein the array substrate further comprises an auxiliary electrode, the auxiliary electrode is disposed on the substrate, the auxiliary electrode is disposed on a same layer with the pixel electrode and has a space, and the auxiliary electrode is disposed between the first pixel electrode and the second pixel electrode.

In one exemplary embodiment, wherein a gap is defined between the second branch electrodes and the fifth branch electrodes, the array substrate further comprises a projection part, the projection part is disposed on the substrate, the projection part is disposed corresponding to the gap, and the projection part is protruded from a surface of the array substrate away from the substrate.

In one exemplary embodiment, wherein the projection part comprises a common electrode and an insulating structure layer laminated to each other, the insulating structure layer is disposed on a side of the common electrode away from the substrate, and the common electrode is configured to protrude the insulating structure layer from the surface of the array substrate away from the substrate.

In one exemplary embodiment, wherein the insulating structure layer comprises a planarization layer or a color filter layer, and the planarization layer or the color filter layer is protruded from a surface of one side of the array substrate away from the substrate.

In one exemplary embodiment, wherein the projection part comprises a planarization layer or a color filter layer, and the planarization layer or the color filter layer is protruded from a surface of one side of the array substrate away from the substrate.

The present invention also provides a liquid crystal display panel, comprising:

an array substrate, wherein the array substrate comprises a substrate and a plurality of electrode units, the plurality of electrode units are disposed on the substrate, the plurality of electrode units comprise a first pixel electrode and a second pixel electrode disposed on one side of the first pixel electrode, the first pixel electrode comprises a plurality of first branch electrodes, the plurality of first branch electrodes are arranged at intervals, the first branch electrodes are configured to guide liquid crystal molecules to a first direction, the second pixel electrode is disposed opposite to the first pixel electrode, the second pixel electrode comprises a plurality of second branch electrodes, the plurality of second branch electrodes are arranged at intervals, and the second branch electrodes are configured to guide the liquid crystal molecules to a second direction, at least part of the first branch electrodes have one end vacant, and at least part of the second branch electrodes have one end vacant;

an opposite substrate, wherein the opposite substrate is disposed opposite to the array substrate; and a liquid crystal layer, wherein the liquid crystal layer is disposed between the array substrate and the opposite substrate.

In one exemplary embodiment, wherein the array substrate further comprises a color filter layer, the color filter layer comprises first color filters, and two adjacent first color filters are respectively disposed corresponding to the first pixel electrode of one electrode unit and the second pixel electrode of another electrode unit.

In one exemplary embodiment, wherein the first pixel electrode further comprises a plurality of third branch electrodes, the third branch electrodes are disposed adjacent to the first branch electrodes, the plurality of third branch electrodes are arranged at intervals, the third branch electrodes are configured to guide the liquid crystal molecules to a third direction, the second pixel electrode further comprises a plurality of fourth branch electrodes, the fourth branch electrodes are disposed adjacent to the second branch electrodes, a plurality of the fourth branch electrodes are arranged at intervals, and the fourth branch electrodes are configured to guide the liquid crystal molecules to a fourth direction; and wherein, at least part of the third branch electrodes have one end vacant, and at least part of the fourth branch electrodes have one end vacant.

In one exemplary embodiment, wherein the opposite substrate comprises a color filter layer, the color filter layer comprises first color filters, and two adjacent first color filters are respectively disposed corresponding to the first pixel electrode of one electrode unit and the second pixel electrode of another electrode unit.

In one exemplary embodiment, wherein the array substrate further comprises an auxiliary electrode, the auxiliary electrode is disposed on the substrate, the auxiliary electrode is disposed on a same layer with the pixel electrode and has a space, and the auxiliary electrode is disposed between the first pixel electrode and the second pixel electrode.

In one exemplary embodiment, wherein a gap defined between the second branch electrodes and the fifth branch electrodes, the array substrate further comprises a projection part, the projection part is disposed on the substrate, the projection part is disposed corresponding to the gap, and the projection part is protruded from a surface of the array substrate away from the substrate.

The present invention provides an array substrate and a liquid crystal display panel. The array substrate provided by the embodiment of the application designs the pixel structure. There is no need to set trunk electrodes between adjacent alignment areas. That is, at the position where the trunk electrode is originally set, the branch electrodes are vacant to divide two sub pixels. From the perspective of electric field driving force, the liquid crystal molecules will not deflect from the middle of the electrode units, which reduces the pretilt conflict of liquid crystal molecules, avoids the problem of mutual obstruction during the deflection of liquid crystal molecules, and then improves the dark mass and solves the problem of uneven display. In addition, among the two adjacent pixels of the pixel structure design provided by the application, the sub-pixel of the same color still has four alignment areas, ensuring the overall viewing angle effect.

BRIEF DESCRIPTION OF DRAWINGS

The technical scheme and other beneficial effects of the present invention will be obvious through the detailed description of the specific exemplary embodiment mode of the invention in combination with the drawings.

DETAILED DESCRIPTION OF PREFERRED EMBODIMENTS

The technical solutions in the embodiments of the present invention will be clearly and completely described below in conjunction with the accompanying drawings in the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention. In addition, it should be understood that the specific embodiments described herein are only used to illustrate and explain the application and are not used to limit the application. In the present application, in the absence of a contrary explanation, the location words used, such as "up" and "down", usually refer to the up and down under the actual use or working state of the device, specifically the drawing direction in the attached drawings; The "inside" and "outside" are for the contour of the device.

The embodiment of the application provides an array substrate and a liquid crystal display panel. These are described in detail below. It should be noted that the order of description of the following embodiments is not a limitation on the preferred order of the embodiments.

Figure 1:
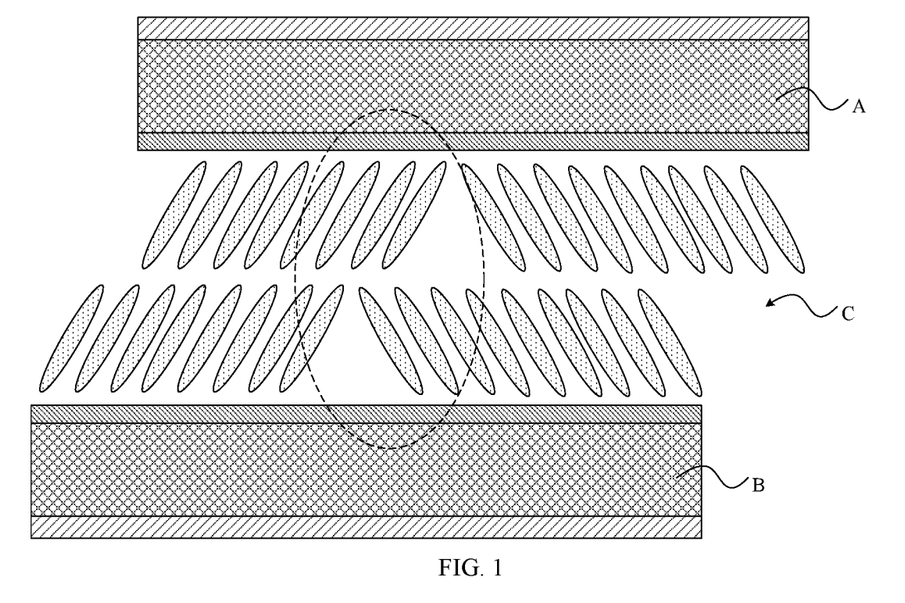
FIG. 1 is a structural diagram of a curved liquid crystal display panel in related technology.

Please refer to FIG. 1, FIG. 1 is a structural diagram of a curved liquid crystal display panel in related technology. When the array substrate A is applied to a curved display screen, since the array substrate A is offset from the opposite substrate B, the liquid crystal molecules C that are sandwiched in the upper and lower substrates are also offset. According to the electric field driving force distribution of multi domain display, in each sub-pixel, liquid crystal molecules begin to deflect from the periphery to the center of the region where each pixel electrode is located, and the pretilt conflict at the junction of the two regions (i.e. the dotted circle in the figure) will be more serious than that at other positions. The conflict of pretilt angle will hinder the deflection of liquid crystal molecule C, as a result, the liquid crystal display panel forms a symmetrical elliptical dark mass adjacent to the two display areas, resulting in uneven display.

Wherein, the pretilt angle refers to the tilt angle of the long axis of the liquid crystal molecules relative to the array substrate 10 or the opposite substrate.

Figure 2:
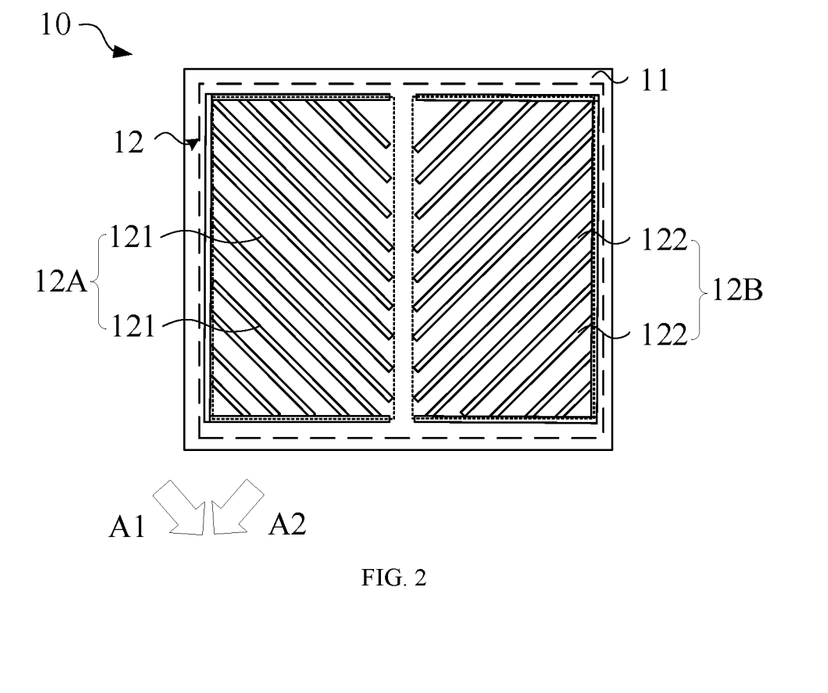
FIG. 2 is a schematic top view of a first structure of an array substrate provided by the embodiment of the present application.

In order to solve the above technical problem, an embodiment of the present application provides an array substrate. Please refer to FIG. 2. FIG. 2 is a schematic top view of a structure of the array substrate provided by the embodiment of the present application. The array substrate 10 comprising a substrate 11 and a plurality of electrode units 12. A plurality of electrode units 12 are disposed on the substrate 11. The plurality of electrode units 12 comprise a first pixel electrode 12A and a second pixel electrode 12B disposed on one side of the first pixel electrode 12A.

The first pixel electrode 12A comprises a plurality of first branch electrodes 121. The plurality of first branch electrodes 121 are arranged at intervals. And the first branch electrode 121 are configured to guide liquid crystal molecules to a first direction A1.

The second pixel electrode 12B is disposed opposite to the first pixel electrode 12A. The second pixel electrode 12B comprises a plurality of second branch electrodes 122. The plurality of second branch electrodes 122 are arranged at intervals. And the second branch electrode 122 are configured to guide the liquid crystal molecules to a second direction A2.

As shown in FIG. 2, at least part of the first branch electrode 121 have one end vacant. And at least part of the second branch electrode 122 have one end vacant.

In this way, the array substrate 10 provided by the embodiment of the present application designs the pixel structure. In a single electrode unit 12, there is no need to set trunk electrodes between adjacent alignment areas. That is, at the position where the trunk electrode is originally set, the branch electrodes are vacant to divide two sub pixels. From the perspective of electric field driving force, the liquid crystal molecules will not deflect from the middle of the electrode units 12, which reduces the pretilt conflict of the corresponding liquid crystal molecules at the junction of two adjacent alignment regions, avoids the problem of mutual obstruction during the deflection of liquid crystal molecules, and then improves the dark mass and solves the problem of uneven display. In addition, since the array substrate 10 provided by the present application can improve the dark mass between the first branch electrode 121 and the second branch electrode 122, the spacing between sub-pixels can be reduced, and the pixel aperture ratio and the resolution of the display panel can be improved.

Figure 3:
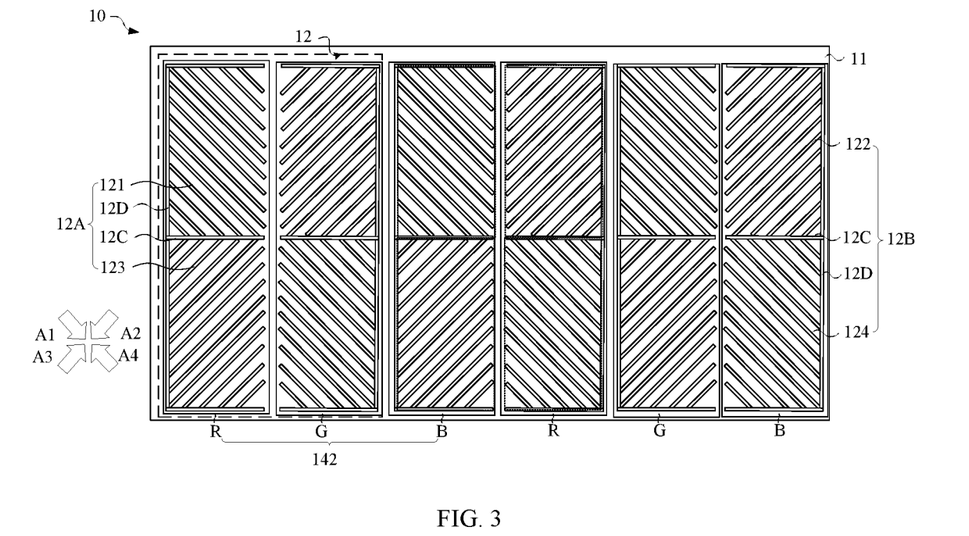
FIG. 3 is a schematic top view of a second structure of the array substrate provided by the embodiment of the present application.

Further, please refer to FIG. 3, FIG. 3 is a schematic top view of the second structure of the array substrate provided by the embodiment of the present application. The first pixel electrode 12A further comprises a plurality of third branch electrodes 123. The third branch electrode 123 are disposed adjacent to the first branch electrode 121. The plurality of third branch electrodes 123 are arranged at intervals. The third branch electrode 123 are configured to guide the liquid crystal molecules to a third direction A3. The second pixel electrode 12B further comprises a plurality of fourth branch electrodes 124. The fourth branch electrodes 124 are disposed adjacent to the second branch electrode 122. The plurality of fourth branch electrodes 124 are arranged at intervals. And the fourth branch electrode 124 are configured to guide the liquid crystal molecules to a fourth direction A4.

Wherein, at least part of the third branch electrode 123 have one end vacant. And at least part of the fourth branch electrode 124 have one end vacant.

Wherein, for some liquid crystal display panels using COA technology, the array substrate 10 further comprises a color filter layer 142. The color filter layer 142 may comprises a first color filter R and a second color filter G. Two adjacent first color filters R are respectively disposed corresponding to the first pixel electrode 12A of one electrode unit 12 and the second pixel electrode 12B of another electrode unit 12. Two adjacent second color filters G are respectively disposed corresponding to the second pixel electrode 12B of one electrode unit 12 and the first pixel electrode 12A of another electrode unit 12. The color filter layer 142 may also comprises a third color filter B, and the number of color filter colors in the color filter layer 142 is not limited in this application. In the embodiment shown in FIG. 3, two adjacent first color filters R are respectively disposed corresponding to the first pixel electrode 12A of the electrode units 12 and the second pixel electrode 12B of the adjacent electrode units 12. The color filters RGB in the color filter layer 142 are arranged in sequence corresponding to the electrode units 12. Such a setting method can make that in two adjacent pixels, the sub-pixels corresponding to the color filter of the same color still have four alignment regions, which ensures the overall viewing angle effect.

Optionally, the first color filter R may represent a red color filter layer, the second color filter G may represent a green color filter layer, and the third color filter B may represent a blue color filter layer. Of course, other color filters may be provided on the array substrate 10, such as a yellow color filter layer, a white color filter layer, and so on. In addition, the RGB arrangement sequence and arrangement pattern in FIG. 3 are only for illustration, and the color filter layers 142 of different colors can also be arranged in other order or arrangement pattern, which is not limited in this application.

Optionally, the electrode units 12 further comprise a plurality of connecting electrodes 12C and a main electrode 12D. One connecting electrode 12C is disposed between the first branch electrodes 121 and the third branch electrodes 123. Another one connecting electrode 12C is disposed on the side of the first branch electrode 121 away from the third branch electrode 123. And the other connecting electrode 12C is disposed on a side of the third branch electrode 123 away from the first branch electrodes 121. And the connecting electrodes 12C connect the first branch electrodes 121 and the third branch electrodes 123. The main electrode 12D is disposed on one side away from the ends vacant of the first branch electrodes 121 and the second branch electrodes 122 and is connected to the first branch electrodes 121 and the third branch electrodes 123.

It should be noted that the connecting electrode 12C and the main electrode 12D are provided to ensure the four-domain alignment of the liquid crystal. Otherwise, the direction of the electric field may change, which in turn causes the alignment direction of the liquid crystal to change, which affects the display.

In the same way, in order to ensure the four-domain alignment of the liquid crystal, one connecting electrode 12C is disposed between the second branch electrodes 122 and the fourth branch electrodes 124. Another one connecting electrode 12C is disposed on a side of the second branch electrode 122 away from the fourth branch electrode 124. And the other connecting electrode is disposed on a side of the fourth branch electrodes 124 away from the second branch electrodes 122. The connecting electrodes 12C connect the second branch electrodes 122 and the fourth branch electrodes 124. The main electrode 12D is disposed on one side away from the ends vacant of the second branch electrodes 122 and the fourth branch electrodes 124, and is connected to the second branch electrodes 122 and the fourth branch electrodes 124.

Wherein, in each zone, a plurality of branch electrodes are parallel to each other and arranged at intervals. This arrangement enables the liquid crystal molecules to be arranged in multiple directions on the horizontal plane to obtain several different alignment areas. In the display area of each domain, the angle between the plurality of branch electrodes and the main electrode 12D is greater than 0 degrees and less than 90 degrees. Optionally, the first branch electrodes 121, the second branch electrodes 122, the third branch electrodes 123, and the fourth branch electrodes 124 are centrally symmetrically arranged. This setting method is more conducive to the alignment performance of the liquid crystal.

Figure 4:
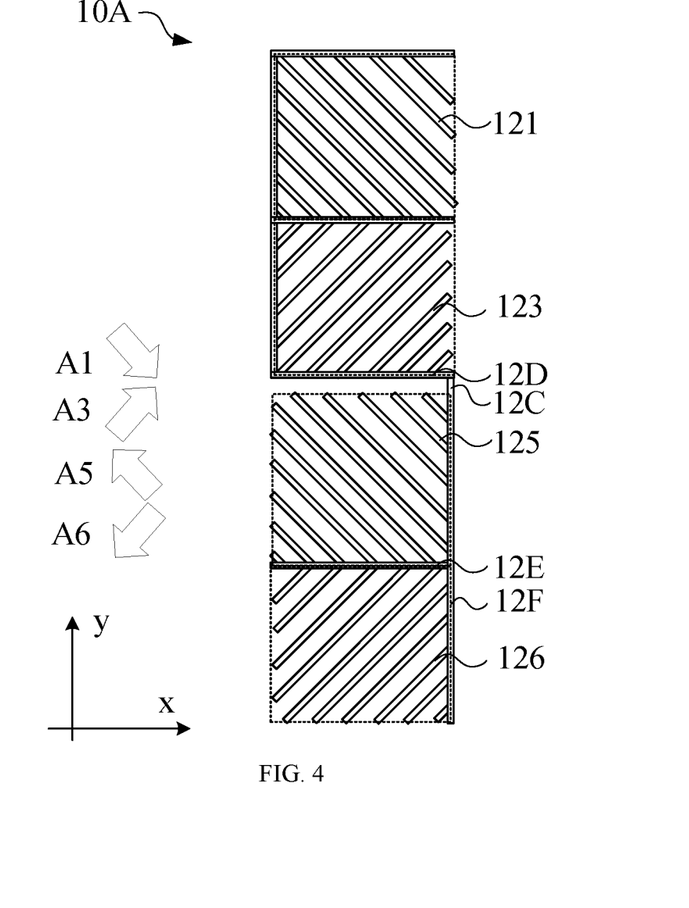
FIG. 4 is a schematic top view of the first structure of the first pixel electrode in the array substrate provided by the embodiment of the present application.

Please refer to FIG. 4. FIG. 4 is a schematic top view of the first structure of the first pixel electrode in the array substrate provided by the embodiment of the present application. The first pixel electrode 12A further comprises a plurality of fifth branch electrodes 125 and a plurality of sixth branch electrodes 126. The plurality of fifth branch electrodes 125 are arranged at intervals. The plurality of sixth branch electrodes 126 are arranged at intervals. The fifth branch electrodes 125 is used to direct liquid crystal molecules in the fifth direction A5, the sixth branch electrode 126 is used to direct liquid crystal molecules in the sixth direction A6, and the fifth branch electrode 125 and the sixth branch electrode 126 follow the first branch electrode 121 in sequence. And the third branch electrode 123 are arranged in the arrangement direction.

Wherein at least part of the fifth branch electrodes 125 have one end vacant. And at least part of the sixth branch electrodes 126 have one end vacant.

By arranging part of the fifth branch electrode 125 and part of the sixth branch electrode 126 with one end vacant, from the perspective of the driving force of the electric field, the liquid crystal molecules will not start to deflect from the junction of the electrode units 12, which reduces the conflict of the pretilt angle of the liquid crystal molecules at the junction of the electrode units 12.

Optionally, the electrode units 12 further comprise a strip electrode 12E and a shaft electrode 12F. The strip electrode 12E is disposed between the fifth branch electrodes 125 and the sixth branch electrodes 126. And the strip electrode 12E is connected to the fifth branch electrodes 125 and the sixth branch electrodes 126. And the shaft electrode 12F is disposed on a side of the fifth branch electrodes 125 and the sixth branch electrodes 126 away from the second pixel electrode 12B and is connected to the fifth branch electrodes 125 and the sixth branch electrodes 126.

Wherein, since the inversion of the liquid crystal molecules corresponding to the electrode units 12 is controlled by the electric field driving force, the electric field driving force is related to the shape of the electrode edge sealing around the branch electrode. Therefore, the electrode arrangement shown in FIG. 4 can ensure that the first branch electrodes 121, the second branch electrodes 122, the fifth branch electrodes 125, and the sixth branch electrodes 126 respectively guide the corresponding liquid crystal molecules to four different directions, thereby ensuring display the overall display viewing angle of the display panel.

Wherein, the main electrode 12D is connected to the shaft electrode 12F through the connecting electrode 12C. Therefore, the branch electrodes of the first pixel electrode 12A are connected together, and there is no need to additionally provide a thin film transistor to control the potential.

Figure 5:
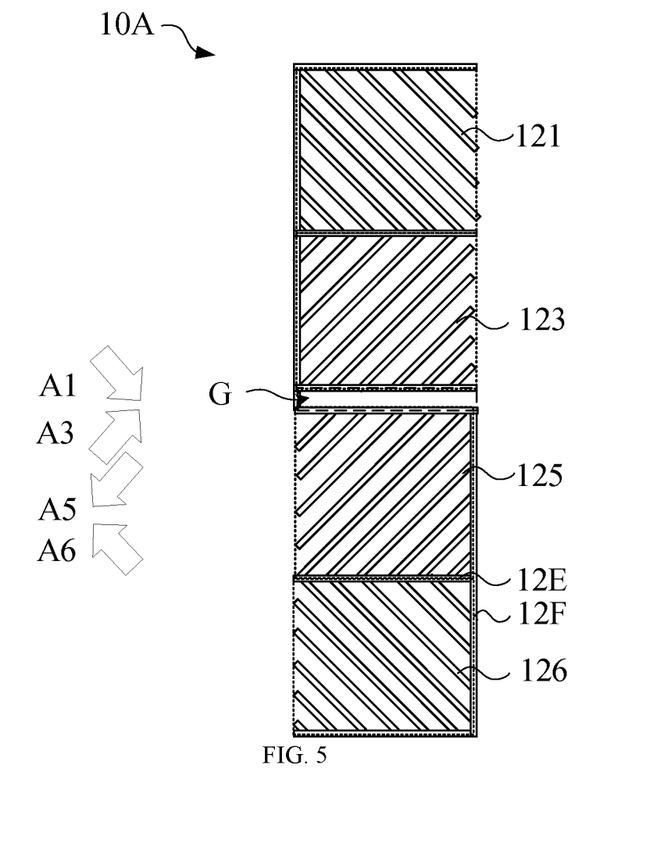
FIG. 5 is a schematic top view of the second structure of the first pixel electrode in the array substrate provided by the embodiment of the present application.

Optionally, please refer to FIG. 5. FIG. 5 is a schematic top view of the second structure of the first pixel electrode in the array substrate provided by the embodiment of the present application. The strip electrode 12E further disposed on a side of the fifth branch electrodes 125 away from the sixth branch electrodes 126 and on a side of the sixth branch electrodes 126 away from the fifth branch electrodes 125.

Wherein, the electrode arrangement shown in FIG. 5 is different from the electrode arrangement shown in FIG. 4. Compared with the arrangement shown in FIG. 4, the electrode arrangement shown in FIG. 5 can change the orientation direction of the liquid crystal molecules corresponding to the fifth branch electrode 125 and the sixth branch electrode 126, thereby obtaining another four-domain alignment pixel design.

In the same way, the second pixel electrode 12B can also have a similar four-domain alignment pixel design to the first pixel electrode 12A. Specifically, please refer to FIG. 6, FIG. 6 is a schematic diagram of the structure of the second pixel electrode 12B in the array substrate provided by the embodiment of the present application.

Wherein, the second pixel electrode 12B further comprises a plurality of seventh branch electrodes 127 and a plurality of eighth branch electrodes 128. The plurality of seventh branch electrodes 127 are arranged at intervals. The plurality of eighth branch electrodes 128 are arranged at intervals. The seventh branch electrodes 127 are configured to guide the liquid crystal molecules to a seventh direction A7. The eighth branch electrodes 128 are configured to guide the liquid crystal molecules to a eighth direction A8. The seventh branch electrodes 127 and the eighth branch electrodes 128 are sequentially arranged along an arrangement direction of the second branch electrodes 122 and the fourth branch electrodes 124.

Wherein, at least part of the seventh branch electrodes 127 have one end vacant. And at least part of the eighth branch electrodes 128 have one end vacant.

Figure 6:
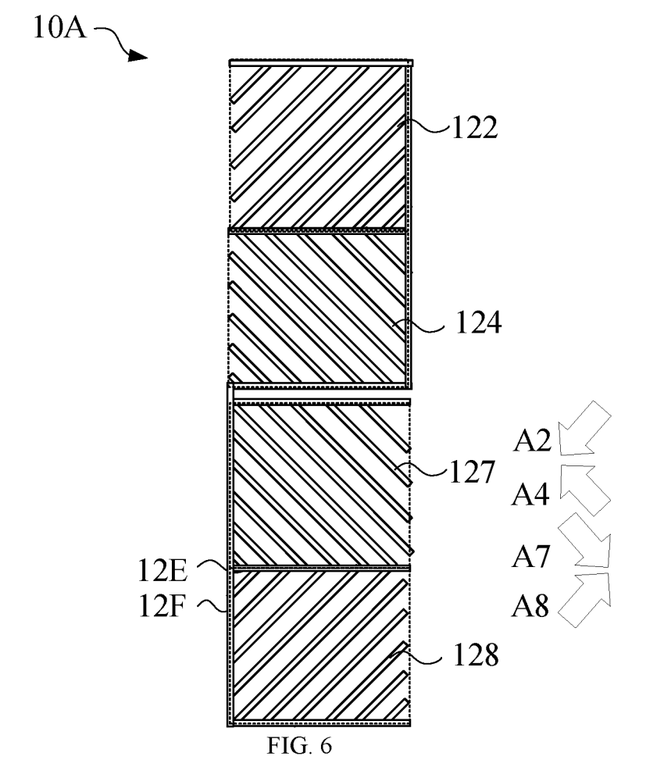
FIG. 6 is a schematic top view of a structure of the second pixel electrode in the array substrate provided by the embodiment of the present application.

In order to ensure the four-domain alignment, FIG. 6 also shows the arrangement of the strip electrode 12E and the shaft electrode 12F. It is understandable that the arrangement of the strip electrode 12E and the shaft electrode 12F only needs to ensure the four-domain alignment in the sub-pixel, and the specific arrangement of the strip electrode 12E and the shaft electrode 12F is not limited in this application.

It should be noted that the strip electrode setting mode shown in FIG. 4 can also be set in the second pixel electrode 12b, which will not be described here.

Figure 7:
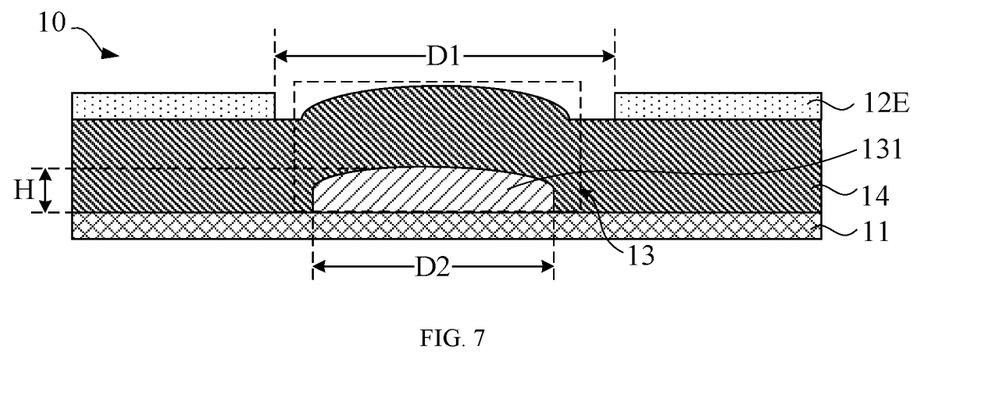
FIG. 7 is a first structural diagram of the array substrate provided by the embodiment of the present application.

Wherein, in each alignment region, the liquid crystal molecules near the corresponding positions of the connecting electrode 12C, the main electrode 12D, the strip electrode 12e and the shaft electrode 12F usually begin to deflect first, and the pretilt conflict of the liquid crystal molecules corresponding to the junction of the second branch electrodes 122 and the fifth branch electrodes 125 will be more serious than other positions. Optionally, please refer to FIG. 5 and FIG. 7. FIG. 7 is a first structural diagram of the array substrate provided by the embodiment of the present application. A gap G is further defined between the third branch electrode 123 and the fifth branch electrode 125. The array substrate 10 further comprises a projection part 13. The projection part 13 is disposed on the substrate 11. The projection part 13 is disposed corresponding to the gap G. The projection part 13 is protrudes from a surface of the array substrate 10 away from the substrate 11.

Wherein, the width D1 of the gap G is between 3 μm and 12 μm. Specifically, the width of the gap G may be 3 μm, 4 μm, 5 μm, 6 μm, 7 μm, 8 μm, 9 μm, 10 μm, 11 μm, or 12 μm. It should be noted that the above values are only examples. In fact, the width of the gap G can be any value between 2 μm and 12 μm. Since the angle of the branch electrodes will affect the tilting direction of the liquid crystal molecules, the width of the gap G can be adaptively designed according to the angle of the branch electrode in each zone. For example, when the angle formed by the first branch electrodes 121 and the second branch electrodes 122 with the first axis x is small, the liquid crystal molecules are more likely to obstruct each other when they deflect. At this time, the width of the gap G can be set to a value close to 12 μm. In the same way, when the angle formed by the first branch electrodes 121 and the second branch electrodes 122 with the first axis x is large, the liquid crystal molecules in two adjacent display areas are tilted at a large angle and are not easy to collide with each other. The width of the gap G is set to a value close to 2 μm to increase the aperture ratio. However, the width of the gap G should not be set to a value less than 2 microns. Due to the limitation of process accuracy, the first branch electrodes 121 and the second branch electrodes 122 are likely to be in contact with each other when the thickness is less than 2 μm, which affects the alignment effect of the liquid crystal molecules.

In the embodiment shown in FIG. 7, the projection part 13 can be provided to protrude the film height of the gap G. Since there is a certain anchoring force between the array substrate 10 and the liquid crystal molecules, when the film layer between two adjacent display areas is protruded, the pretilt angle of the corresponding liquid crystal molecule can be slightly different from the corresponding liquid crystal molecules on both sides, thereby reducing the difference between the pretilt angles of the liquid crystal molecules corresponding to two adjacent display areas. As a result, disposing the projection part 13 adjacent to the two display areas can improve the phenomenon of dark mass during display.

Wherein, the height H of the projection part 13 is between 0.05 μm and 1 μm. Specifically, the height H of the projection part 13 may be 0.05 μm, 0.1 μm, 0.2 μm, 0.3 μm, 0.4 μm, 0.5 μm, 0.6 μm, 0.7 μm, 0.8 μm, 0.9 μm, or 1 μm. If the height H of the projection part 13 is too high, the pretilt angle difference between the liquid crystal molecules corresponding to the projection part 13 and the liquid crystal molecules on both sides is too large, and dark mass are likely to be generated on both sides of the projection part 13. If the height H of the projection part 13 is too low, it is difficult for the projection part 13 to protrude the film layer, and the difference in the angle between the liquid crystal molecules corresponding to the projection part 13 and the liquid crystal molecules on both sides cannot improve the dark mass.

Wherein, the protrusion shape of the projection part 13 is a symmetrical shape, and the symmetric projection part 13 can better balance the pretilt angle between two adjacent display areas along the first direction.

Wherein, the projection part 13 may comprise a metal film layer. When the projection part 13 comprises a metal film layer, an insulating structure layer 14 must be disposed to prevent the metal film layer from contacting the pixel electrode and cause a short circuit. Specifically, a metal layer is disposed in the array substrate 10 to form a common electrode or other wires, and the metal film layer in the projection part 13 can be disposed in the same layer as the metal layer of the array substrate to save process cost.

Please continue to refer to FIG. 7, the projection part comprises a common electrode 131 and an insulating structure layer 14 laminated to each other. The insulating structure layer 14 is disposed on the side of the common electrode 131 away from the substrate 11. The common electrode 131 is configured to protrude the insulating structure layer 14 from the surface of the array substrate 10 away from the substrate 11.

Wherein, the width D2 of the common electrode 131 is between 3 μm and 10 μm. Specifically, the width of the common electrode 131 may be 3 μm, 4 μm, 5 μm, 6 micrometers, 7 μm, 8 μm, 9 μm, or 10 μm. The width of the common electrode 131 can also be other values between 3 μm and 10 μm. Considering the limitation of process accuracy, the width of the common electrode 131 is set to be 3 μm or more. In addition, in order to ensure the display effect of the display panel, the width of the common electrode 131 is set to 10 μm or less. In addition, if the width of the common electrode 131 is too wide, on one hand, it will affect the aperture ratio of the display panel, on the other hand, the common electrode 131 may overlap with the upper electrode units 12, and the higher film layer will affect the arrangement of the electrode units 12, which in turn affects the deflection of liquid crystal molecules. If the width of the common electrode 131 is too narrow, the effect of improving the pretilt angle conflict between two adjacent display areas is not obvious, and the effect of improving the dark mass cannot be achieved.

In the embodiment shown in FIG. 7, the common electrode 131 and the insulating structure layer 14 stacked on the common electrode 131 are configured to the projection part 13 to increase the height of the film. The common electrode 131 disposed corresponding to the gap G is illustrated in FIG. 4. In actual products, the common electrode 131 may also have other patterned designs. The common electrode 131 is an inherent film structure in the array substrate 10. In this embodiment, only the common electrode 131 needs to be patterned to form the projection part 13, which can simplify the manufacturing process of the projection part 13. In addition, the common electrode 131 is made of a metal material, which can block the transmitted light at the corresponding position of the projection part 13 and reduce the influence of the dislocation of the upper and lower substrates in the curved display screen on the display.

The common electrode 131 can be directly connected to the common electrode in other positions, or connected through a via hole. After the common electrode 131 is connected to the common electrode at other positions, the common electrode 131 can obtain the same potential as the common electrode at other positions. As a result, it can be ensured that the deflection of the liquid crystal molecules at two adjacent display areas is not affected.

Optionally, the projection part 13 may also be formed by the insulating structure layer 14. For example, the insulating structure layer 14 includes a planarization layer. The planarization layer is protruded on the surface of the array substrate 10 away from the substrate 11. For another example, the insulating structure layer 14 includes a color filter layer. The color filter layer protruded from a surface of the array substrate 10 away from the substrate 11.

Figure 8:
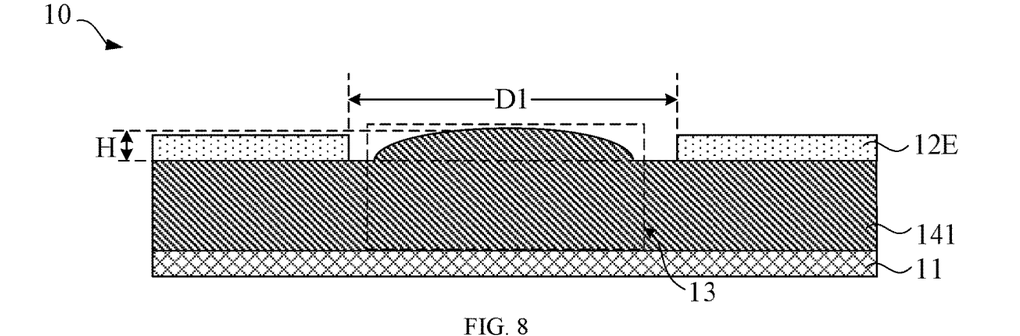
FIG. 8 is a second structural diagram of the array substrate provided by the embodiment of the present application.

Optionally, the projection part 13 may be directly formed by a film layer such as a planarization layer or a color filter layer. Specifically, please refer to FIG. 8. FIG. 8 is a second structural diagram of the array substrate provided by the embodiment of the present application. The projection part 13 includes a planarization layer 141. The planarization layer 141 is protruded on the surface of the array substrate 10 away from the substrate 11.

In the embodiment shown in FIG. 7, the projection part 13 comprises a planarization layer 141. The planarization layer 141 can be differentiated by changing the exposure amount by using a halftone mask method. As a result, the planarization layer 141 is protruded on the side of the array substrate 10 away from the substrate 11.

In this embodiment, the projection part is directly formed on the planarization layer 141, and the manufacturing process is relatively simple. Generally, the electrode units 12 are disposed on the planarization layer 141. In this embodiment, the projection part 13 is formed on the planarization layer 141, which can avoid the influence on other film layers. Moreover, it is not necessary to adapt the specific assembly of other film layers after setting the projection part.

Figure 9:
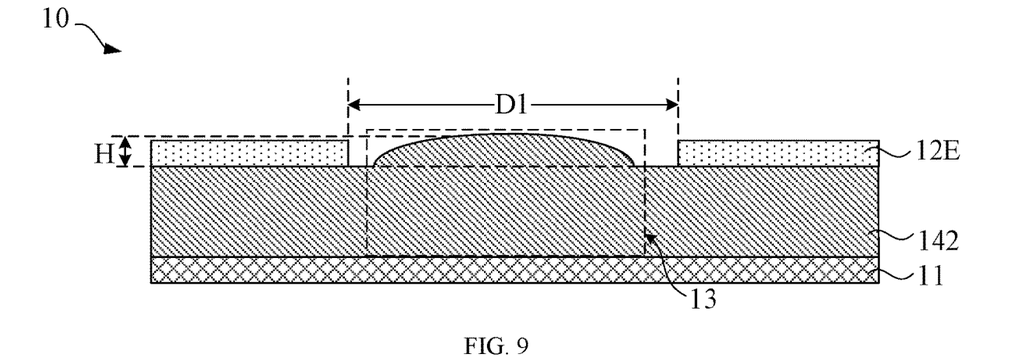
FIG. 9 is a third structural diagram of the array substrate provided by the embodiment of the present application.

Optionally, please refer to FIG. 9. FIG. 9 is a third structural diagram of the array substrate provided by the embodiment of the present application. The projection part 13 comprises a color filter layer 142. The color filter layer 142 is protruded from a surface of one side of the array substrate 10 away from the substrate 11.

For some liquid crystal display panels using COA technology, protrusions may be provided on the color filter layer 142 to form the projection part 13. COA (Color Filter on Array) technology is a technology in which the color filter layer is prepared on the array substrate. The COA structure of the liquid crystal display panel does not have the problem of alignment between the color filter substrate and the array substrate, so the difficulty of the cell-setting process in the preparation process of the display panel can be reduced, and the error in the cell-setting process can be avoided. The black matrix in the COA structure can be designed as narrow line width improves the aperture ratio. In this application, the color filter layer 142 is configured to form the projection part 13, so that the array substrate 10 provided in this application can be applied to a COA type liquid crystal display panel, and the application range is wider.

It should be noted that the projection part 13 in the array substrate 10 provided by the embodiment of the present application may also be formed by a protrusion provided on any one of the substrate 11 and the electrode units 12, which is not limited in the present application.

Figure 10:
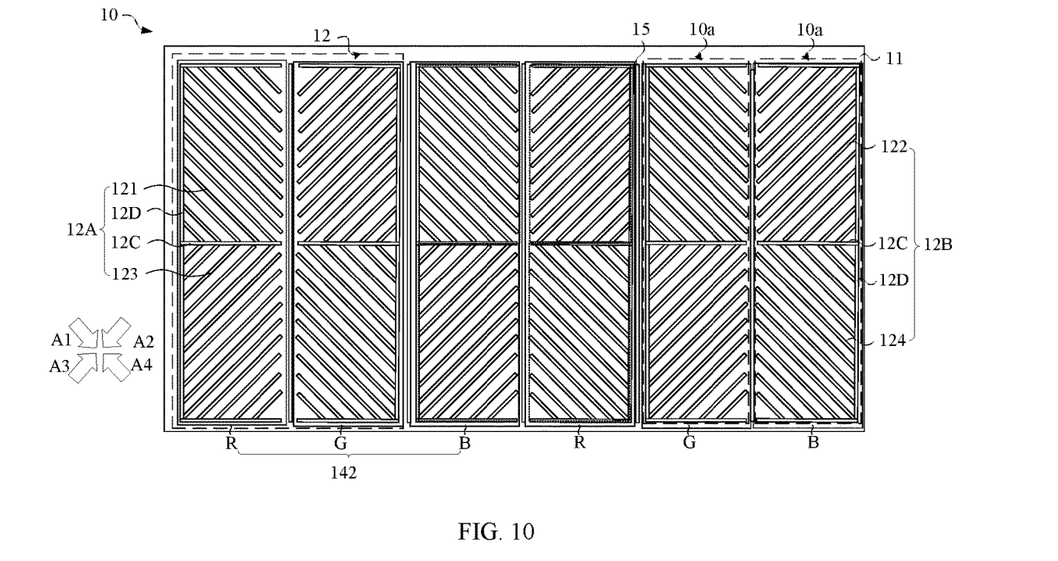
FIG. 10 is a schematic top view of the second structure of the array substrate provided by the embodiment of the present application.

Please refer to FIG. 10. FIG. 10 is a schematic top view of the second structure of the array substrate provided by the embodiment of the present application. The array substrate 10 further comprises an auxiliary electrode 15. The auxiliary electrode 15 is disposed on a same layer with the electrode units 12 and have a space. And the auxiliary electrode 15 is provided between the sub-pixels 10a.

Wherein, a black matrix (BM) may be disposed on the opposite substrate of the array substrate 10 to shield the circuit from light, or as shown in FIG. 10, an auxiliary electrode 15 may be used to replace the black matrix for light shielding. The embodiment shown in FIG. 10 adopts a design of Data line BM Less (DBS), and cover the data line with a conductive trace, that is, the auxiliary electrode 15. For example, the auxiliary electrode 15 may be an indium tin oxide (ITO) trace. The ITO traces are arranged along the direction of the data lines, and the width of the ITO traces is slightly wider than that of the data lines, and these ITO traces are connected to the common electrode. When the liquid crystal display panel is working normally, the electric field formed by these DBS electrodes and the common electrode (not shown in the figure) of the opposite substrate can keep the liquid crystal molecules in an undeflected state, thereby achieving the purpose of shielding light.

Therefore, in the embodiment shown in FIG. 10, an auxiliary electrode 15 is provided between the sub-pixels 10a. The potential of the auxiliary electrode 15 is the same as the potential of the common electrode of the opposite substrate, and the liquid crystal molecules corresponding to the auxiliary electrode 15 will not be deflected. As a result, conflicts between the pretilt angles of the liquid crystal molecules of two adjacent sub-pixels are avoided, and the phenomenon of displaying dark clusters is improved.

Wherein, when the auxiliary electrode 15 is disposed in the gap G, the distance between the auxiliary electrode 15 and the branch electrodes in two adjacent pixel electrodes is equal. By adopting this method to dispose the auxiliary electrode 15, the auxiliary electrode 15 can be positioned at the center of the electrode units 12, and the conflict of the pretilt angle of the liquid crystal molecules at the center of the electrode units 12 can be better balanced.

Figure 11:
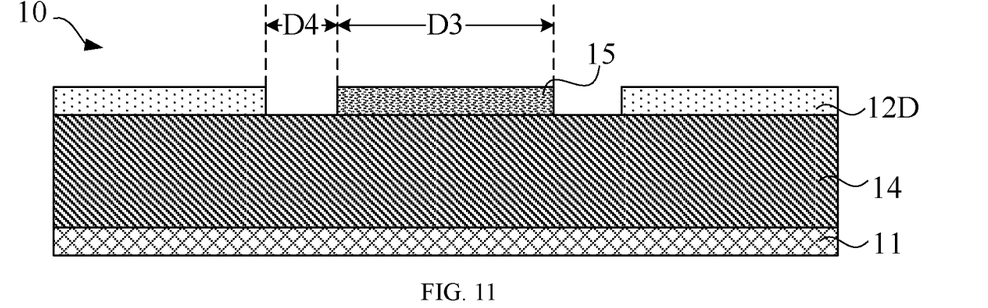
FIG. 11 is a fourth structural diagram of the array substrate provided by the embodiment of the present application.

Please refer to FIG. 11. FIG. 11 is a fourth structural diagram of the array substrate provided by the embodiment of the present application. The width D3 of the auxiliary electrode 15 is between 2 μm to 10 μm. Specifically, the width D3 of the auxiliary electrode 15 may be 2 μm, 3 μm, 4 μm, 5 μm, 6 μm, 7 μm, 8 μm, 9 μm, or 10 μm.

Wherein, the distance D4 between the auxiliary electrode 15 and the electrode units 12 is between 1 μm and 5 μm.

Specifically, the distance D4 between the auxiliary electrode 15 and the electrode units 12 may be 1 μm, 2 μm, 3 μm, 4 μm, or 5 μm.

In order to avoid affecting the pixel aperture ratio, it is necessary to ensure that the width of the gap G cannot be too large. Then, the auxiliary electrode 15 is disposed in the gap G, and the width of the auxiliary electrode 15 needs to be ensured not to be too small, otherwise a good shielding light effect cannot be achieved. However, the width of the auxiliary electrode 15 should not be too large. If the width of the auxiliary electrode 15 is too large, the distance to the electrode units 12 will be relatively close, which will generate parasitic capacitance between the electrode units 12 and the auxiliary electrode 15 and affect deflection of the liquid crystal molecules. Considering the requirements of process accuracy and display effect, the width D3 of the two auxiliary electrodes 152 is set to be between 2 μm and 10 μm, and the distance D4 between the auxiliary electrode 15 and the electrode units 12 is set to be between 3 μm and 15 μm.

Figure 12:
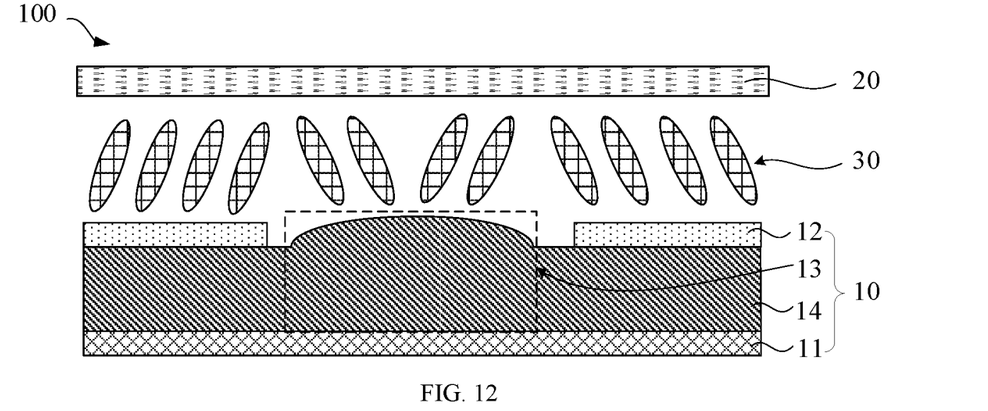
FIG. 12 is a first structural diagram of a liquid crystal display panel provided by an embodiment of the present application.

The embodiment of the present application also provides a liquid crystal display panel. Please refer to FIG. 12, FIG. 12 is a first structural diagram of a liquid crystal display panel provided by an embodiment of the present application. The liquid crystal display panel 100 comprises an array substrate 10, an opposite substrate 20 and a liquid crystal layer 30. The array substrate 10 is the array substrate 10 described in any one of the above. The opposite substrate 20 is disposed opposite to the array substrate 10. The liquid crystal layer 30 is disposed between the array substrate 10 and the opposite substrate 20. The liquid crystal display panel 100 may also comprise other devices. In the embodiments of the present application, the opposite substrate 20, the liquid crystal layer 30, other devices and their assembly are related technologies well known to those skilled in the art, and will not be repeated here.

The array substrate 10 provided by the embodiment of the present application may be applied to a COA type structure or a non-COA type structure. When the array substrate 10 is applied to the COA structure, the color filter layer is disposed on the side of the array substrate 10. When the array substrate 10 is applied to a non-COA structure, the color filter layer is disposed on the opposite substrate 20 side.

Figure 13:
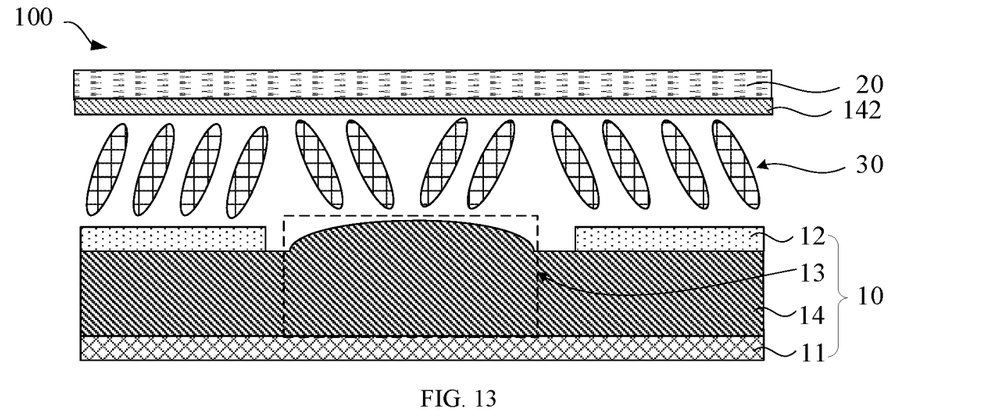
FIG. 13 is a second structural diagram of a liquid crystal display panel provided by an embodiment of the present application.

Optionally, please refer to FIG. 3 and FIG. 13 at the same time. FIG. 13 is a second structural diagram of a liquid crystal display panel provided by an embodiment of the present application. The opposite substrate 20 comprises a color filter layer 142. The color filter layer 142 comprises first color filters R and second color filters G. Two adjacent first color filters R are respectively disposed corresponding to the first pixel electrode 12A of one electrode unit 12 and the second pixel electrode 12B of another electrode unit 12. Two adjacent second color filters G are respectively disposed corresponding to the second pixel electrode 12B of one electrode unit 12 and the first pixel electrode 12A of another electrode unit 12

Optionally, the color filter layer 142 may also include a third color filter B, and the number of color filter colors in the color filter layer 142 is not limited in this application. In the embodiment shown in FIG. 2, two adjacent first color r filters R are respectively arranged corresponding to the first pixel electrode 12A of one electrode unit 12 and the second pixel electrode 12B of the adjacent electrode unit 12. The color filters RGB in the color filter layer 142 are disposed in sequence corresponding to the electrode units 12. Such a setting method can make that in two adjacent pixels, the sub-pixels corresponding to the same color filter still have four alignment regions, ensuring the overall viewing angle effect.

The liquid crystal display panel 100 provided by the embodiment of the present application comprises an array substrate 10. By designing the pixel structure of the array substrate 10, the pretilt angle difference at the junction between adjacent sub-pixel alignment regions is resolved, and the pretilt angle conflict in the electrode units is reduced. The array substrate 10 provided by the embodiment of the present application reduces the pretilt angle conflict between two adjacent alignment regions, thereby preventing the problem of mutual obstruction of liquid crystal molecules when deflecting, thereby improving dark mass and solving the problem of uneven display.

The above provides a detailed introduction to an array substrate and a liquid crystal display provided by the present invention. Specific examples are used in this article to illustrate the principle and implementation of the present invention. The description of the above embodiments is only used to help understand the present invention. At the same time, for those skilled in the art, according to the idea of the present invention, there will be changes in the specific implementation and the scope of application. In summary, the content of this specification should not be construed as a limitation to the present invention.

What is claimed is:

1. An array substrate, comprising:
a substrate; and
a plurality of electrode units, wherein the plurality of electrode units are disposed on the substrate, and each of the plurality of electrode units comprises a first pixel electrode and a second pixel electrode disposed on one side of the first pixel electrode;
wherein the first pixel electrode comprises a plurality of first branch electrodes, the plurality of first branch electrodes are arranged at intervals, and the first branch electrodes are configured to guide liquid crystal molecules to a first direction;
the second pixel electrode is disposed opposite to the first pixel electrode, the second pixel electrode comprises a plurality of second branch electrodes, the plurality of second branch electrodes are arranged at intervals, and the second branch electrodes are configured to guide the liquid crystal molecules to a second direction; and
at least part of the first branch electrodes close to the second branch electrodes have one end vacant, and at least part of the second branch electrodes close to the first branch electrodes have one end vacant;
wherein the first pixel electrode further comprises a plurality of third branch electrodes, the third branch electrodes are disposed adjacent to the first branch electrodes, the plurality of third branch electrodes are arranged at intervals, the third branch electrodes are configured to guide the liquid crystal molecules to a third direction, the second pixel electrode further comprises a plurality of fourth branch electrodes, the fourth branch electrodes are disposed adjacent to the second branch electrodes, a plurality of the fourth branch electrodes are arranged at intervals, and the fourth branch electrodes are configured to guide the liquid crystal molecules to a fourth direction; and
wherein at least part of the third branch electrodes have one end vacant, and at least part of the fourth branch electrodes have one end vacant;
wherein the first pixel electrode further comprises a plurality of fifth branch electrodes and a plurality of sixth branch electrodes, the plurality of fifth branch electrodes are arranged at intervals, the plurality of sixth branch electrodes are arranged at intervals, the fifth branch electrodes are configured to guide the liquid crystal molecules to a fifth direction, the sixth branch electrodes are configured to guide the liquid crystal molecules to a sixth direction, and the fifth branch electrodes and the sixth branch electrodes are sequentially arranged along an arrangement direction of the first branch electrodes and the third branch electrodes; and
wherein at least part of the fifth branch electrodes have one end vacant, and at least part of the sixth branch electrodes have one end vacant.

2. The array substrate according to claim 1, wherein the array substrate further comprises a color filter layer, the color filter layer comprises first color filters, and two adjacent first color filters are respectively disposed corresponding to the first pixel electrode of one electrode unit and the second pixel electrode of another electrode unit.

3. The array substrate according to claim 1, wherein each of the electrode units further comprises a plurality of connecting electrodes and a main electrode;
one connecting electrode is disposed between the first branch electrodes and the third branch electrodes, another one connecting electrode is disposed on a side of the first branch electrodes away from the third branch electrodes, and the other connecting electrode is disposed on a side of the third branch electrodes away from the first branch electrodes, and the connecting electrodes connect the first branch electrodes and the third branch electrodes; and
the main electrode is disposed on one side away from the ends vacant of the first branch electrodes and the third branch electrodes and is connected with the first branch electrodes and the third branch electrodes.

4. The array substrate according to claim 1, wherein each of the electrode units further comprises a plurality of connecting electrodes and a main electrode;
one connecting electrode is disposed between the second branch electrodes and the fourth branch electrodes, another one connecting electrode is disposed on a side of the second branch electrodes away from the fourth branch electrodes, and the other connecting electrode is disposed on a side of the fourth branch electrodes away from the second branch electrodes, and the connecting electrodes connect the second branch electrodes and the fourth branch electrodes; and
the main electrode is disposed on one side away from the ends vacant of the second branch electrodes and the fourth branch electrodes and is connected with the second branch electrodes and the fourth branch electrodes.

5. The array substrate according to claim 1, wherein the electrode units further comprise one or more strip electrodes and a shaft electrode;
one of the strip electrode is disposed between the fifth branch electrodes and the sixth branch electrodes, and the strip electrode is connected with the fifth branch electrodes and the sixth branch electrodes; and
the shaft electrode is disposed on a side of the fifth branch electrodes and the sixth branch electrodes away from the second pixel electrode and is connected with the fifth branch electrodes and the sixth branch electrodes.

6. The array substrate according to claim 5, wherein the strip electrodes are further disposed on a side of the fifth branch electrodes away from the sixth branch electrodes and on a side of the sixth branch electrodes away from the fifth branch electrodes.

7. The array substrate according to claim 1, wherein the second pixel electrode further comprises a plurality of seventh branch electrodes and a plurality of eighth branch electrodes, the plurality of seventh branch electrodes are arranged at intervals, the plurality of eighth branch electrodes are arranged at intervals, the seventh branch electrodes are configured to guide the liquid crystal molecules to a seventh direction, the eighth branch electrodes are configured to guide the liquid crystal molecules to an eighth direction, the seventh branch electrodes and the eighth branch electrodes are sequentially arranged along an arrangement direction of the second branch electrodes and the fourth branch electrodes; and
wherein at least part of the seventh branch electrodes have one end vacant, and at least part of the eighth branch electrodes have one end vacant.

8. The array substrate according to claim 1, wherein the array substrate further comprises an auxiliary electrode, the auxiliary electrode is disposed on the substrate, the auxiliary electrode is disposed on a same layer with the pixel electrode and has a space, and the auxiliary electrode is disposed between the first pixel electrode and the second pixel electrode.

9. The array substrate according to claim 1, wherein a gap is defined between the third branch electrodes and the fifth branch electrodes, the array substrate further comprises a projection part, the projection part is disposed on the substrate, the projection part is disposed corresponding to the gap, and the projection part is protruded from a surface of the array substrate away from the substrate.

10. The array substrate according to claim 9, wherein the projection part comprises a common electrode and an insulating structure layer laminated to each other, the insulating structure layer is disposed on a side of the common electrode away from the substrate, and the common electrode is configured to protrude the insulating structure layer from the surface of the array substrate away from the substrate.

11. The array substrate according to claim 10, wherein the insulating structure layer comprises a planarization layer or a color filter layer, and the planarization layer or the color filter layer is protruded from a surface of one side of the array substrate away from the substrate.

12. The array substrate according to claim 9, wherein the projection part comprises a planarization layer or a color filter layer, and the planarization layer or the color filter layer is protruded from a surface of one side of the array substrate away from the substrate.

13. A liquid crystal display panel, comprising:
an array substrate, wherein the array substrate comprises a substrate and a plurality of electrode units, the plurality of electrode units are disposed on the substrate, each of the plurality of electrode units comprises a first pixel electrode and a second pixel electrode disposed on one side of the first pixel electrode, the first pixel electrode comprises a plurality of first branch electrodes, the plurality of first branch electrodes are arranged at intervals, the first branch electrodes are configured to guide liquid crystal molecules to a first direction, the second pixel electrode is disposed opposite to the first pixel electrode, the second pixel electrode comprises a plurality of second branch electrodes, the plurality of second branch electrodes are arranged at intervals, and the second branch electrodes are configured to guide the liquid crystal molecules to a second direction, at least part of the first branch electrodes close to the second branch electrodes have one end vacant, and at least part of the second branch electrodes close to the first branch electrodes have one end vacant;
an opposite substrate, wherein the opposite substrate is disposed opposite to the array substrate; and
a liquid crystal layer, wherein the liquid crystal layer is disposed between the array substrate and the opposite substrate;
wherein the first pixel electrode further comprises a plurality of third branch electrodes, the third branch electrodes are disposed adjacent to the first branch electrodes, the plurality of third branch electrodes are arranged at intervals, the third branch electrodes are configured to guide the liquid crystal molecules to a third direction, the second pixel electrode further comprises a plurality of fourth branch electrodes, the fourth branch electrodes are disposed adjacent to the second branch electrodes, a plurality of the fourth branch electrodes are arranged at intervals, and the fourth branch electrodes are configured to guide the liquid crystal molecules to a fourth direction; and
wherein, at least part of the third branch electrodes have one end vacant, and at least part of the fourth branch electrodes have one end vacant;
wherein the first pixel electrode further comprises a plurality of fifth branch electrodes and a plurality of sixth branch electrodes, the plurality of fifth branch electrodes are arranged at intervals, the plurality of sixth branch electrodes are arranged at intervals, the fifth branch electrodes are configured to guide the liquid crystal molecules to a fifth direction, the sixth branch electrodes are configured to guide the liquid crystal molecules to a sixth direction, and the fifth branch electrodes and the sixth branch electrodes are sequentially arranged along an arrangement direction of the first branch electrodes and the third branch electrodes; and
wherein at least part of the fifth branch electrodes have one end vacant, and at least part of the sixth branch electrodes have one end vacant.

14. The liquid crystal display panel according to claim 13, wherein the array substrate further comprises a color filter layer, the color filter layer comprises first color filters, and two adjacent first color filters are respectively disposed corresponding to the first pixel electrode of one electrode unit and the second pixel electrode of another electrode unit.

15. The liquid crystal display panel according to claim 13, wherein the opposite substrate comprises a color filter layer, the color filter layer comprises first color filters, and two adjacent first color filters are respectively disposed corresponding to the first pixel electrode of one electrode unit and the second pixel electrode of another electrode unit.

16. The liquid crystal display panel according to claim 13, wherein the array substrate further comprises an auxiliary electrode, the auxiliary electrode is disposed on the substrate, the auxiliary electrode is disposed on a same layer with the pixel electrode and has a gap, and the auxiliary electrode is disposed between the first pixel electrode and the second pixel electrode.

17. The liquid crystal display panel according to claim 13, wherein a gap defined between the third branch electrodes and the fifth branch electrodes, the array substrate further comprises a projection part, the projection part is disposed on the substrate, the projection part is disposed corresponding to the gap, and the projection part is protruded from a surface of the array substrate away from the substrate.

18. An array substrate, comprising:

a substrate; and a plurality of electrode units, wherein the plurality of electrode units are disposed on the substrate, and each of the plurality of electrode units comprises a first pixel electrode and a second pixel electrode disposed on one side of the first pixel electrode;

wherein the first pixel electrode comprises a plurality of first branch electrodes, the plurality of first branch electrodes are arranged at intervals, and the first branch electrodes are configured to guide liquid crystal molecules to a first direction;

the second pixel electrode is disposed opposite to the first pixel electrode, the second pixel electrode comprises a plurality of second branch electrodes, the plurality of second branch electrodes are arranged at intervals, and the second branch electrodes are configured to guide the liquid crystal molecules to a second direction; and at least part of the first branch electrodes close to the second branch electrodes have one end vacant, and at least part of the second branch electrodes close to the first branch electrodes have one end vacant;

wherein the first pixel electrode further comprises a plurality of third branch electrodes, the third branch electrodes are disposed adjacent to the first branch electrodes, the plurality of third branch electrodes are arranged at intervals, the third branch electrodes are configured to guide the liquid crystal molecules to a third direction, the second pixel electrode further comprises a plurality of fourth branch electrodes, the fourth branch electrodes are disposed adjacent to the second branch electrodes, a plurality of the fourth branch electrodes are arranged at intervals, and the fourth branch electrodes are configured to guide the liquid crystal molecules to a fourth direction; and wherein at least part of the third branch electrodes have one end vacant, and at least part of the fourth branch electrodes have one end vacant;

wherein the second pixel electrode further comprises a plurality of seventh branch electrodes and a plurality of eighth branch electrodes, the plurality of seventh branch electrodes are arranged at intervals, the plurality of eighth branch electrodes are arranged at intervals, the seventh branch electrodes are configured to guide the liquid crystal molecules to a seventh direction, the eighth branch electrodes are configured to guide the liquid crystal molecules to an eighth direction, the seventh branch electrodes and the eighth branch electrodes are sequentially arranged along an arrangement direction of the second branch electrodes and the fourth branch electrodes; and wherein at least part of the seventh branch electrodes have one end vacant, and at least part of the eighth branch electrodes have one end vacant.

\* \* \* \* \*